Jan. 12, 1954
G. A. REAM
2,665,570
CONVEYER DRIVE SHEAR PIN ASSEMBLY
Filed Nov. 8, 1951
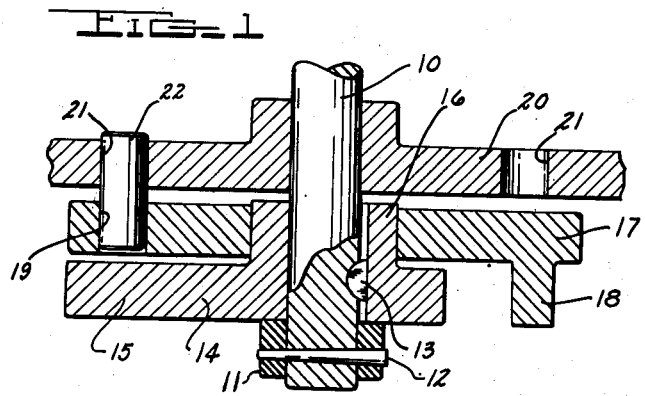
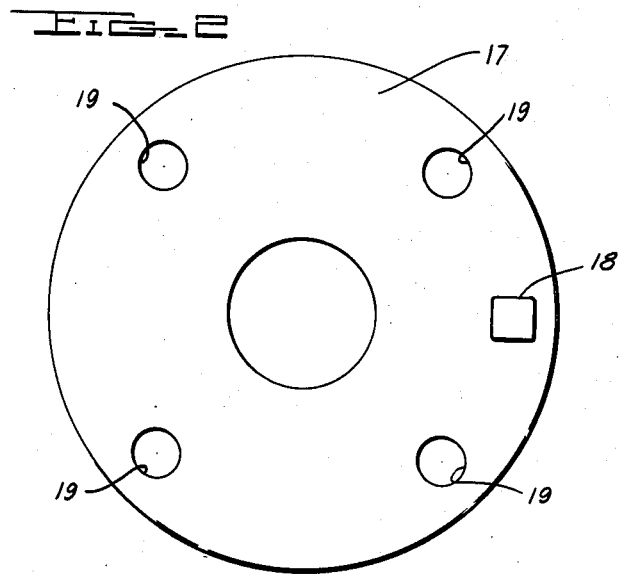
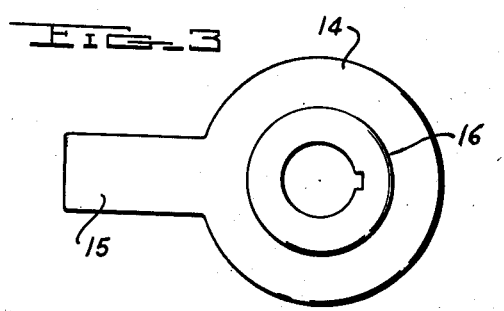
INVENTOR.
GORDON A. REAM
BY
Smith, Olsen
and Kotts
ATTORNEYS Patented Jan. 12, 1954

2,665,570

UNITED STATES PATENT OFFICE 2,665,570

CONVEYER DRIVE SHEAR PIN ASSEMBLY

Gordon A. Ream, Dearborn, Mich.

Application November 8, 1951, Serial No. 255,492

3 Claims. (Cl. 64—28)

The present invention relates to a conveyor drive shear pin assembly and it consists in the combinations, constructions and arrangements of parts herein described and claimed.

Generally the structure herein described permits the removal of broken pins and the replacement of new ones much easier than is possible with the conventional drive.

It is accordingly an object of the invention to provide a novel conveyor drive shear pin assembly.

Another object of the invention is to provide a device of the character set forth which is simple in construction, inexpensive to manufacture and yet effective and efficient in use.

A further object of the invention is to provide, in a device of the character set forth, a novel carrier element forming a part of the invention.

Other and further objects of the invention will become apparent from a reading of the following specification taken in conjunction with the drawing, in which:

Figure 1 is a fragmentary transverse sectional view, partly in elevation, of an embodiment of the invention, Figure 2 is an elevational view of a carrier forming a part of the invention, and Figure 3 is an elevational view of a driving element forming a part of the invention.

Referring more particularly to the drawing, there is shown therein a driving shaft which is preferably extended from a motor and speed reducer, the driving shaft being indicated at 10, and which is provided at its outer end with a retaining ring 11 which is held thereon by means of a tapered pin 12. The shaft 10 is keyed, as indicated at 13, to a circular driving element 14 which is provided with a radially and outwardly extending lug 15.

The driving element is formed with an inwardly extending integrally formed hub portion 16 upon which is revolubly mounted a circular carrier plate 17 provided adjacent its outer periphery with an integrally formed outwardly extending lug 18. The plate 17 is provided with a plurality of circumferentially spaced circular openings 19.

Inwardly of the plate 17 there is revolubly mounted upon the shaft 10 a sprocket 20 having a plurality of circumferentially spaced circular openings 21 and a shear pin 22 extends through one of the openings 21 and one of the openings 19 in the plate 17.

In operation, it will be apparent that when the shear pin 22 breaks off for any reason whatever, the carrier plate 17 may be moved forwardly or rearwardly by hand until a pair of the openings 19 and 21 are brought into registry whereupon the broken pin may be knocked out and a new pin installed. In the event that there are five holes in the carrier plate 17 and six holes in the sprocket 20, only one shear pin may be used. With four holes in the carrier plate and six such holes in the sprocket 20, two pins may be utilized.

While but one form of the invention has been shown and described herein, it will be readily apparent to those skilled in the art that many minor modifications may be made without departing from the spirit of the invention or the scope of the appended claims.

What is claimed is:

1. A device of the character described comprising a shaft, a circular driving element keyed to said shaft and having inwardly extending hub portion surrounding said shaft, a circular carrier plate revolubly mounted upon said hub, a sprocket mounted upon said shaft inwardly of said plate, a radially extending lug affixed to said driving element, an outwardly extending lug affixed to said plate adjacent the periphery thereof, said lugs adapted to engage and drive with a lost motion of slightly less than one complete revolution of said driving element, and a shear pin interconnecting said sprocket and said plate.

2. A device of the character described comprising a shaft, a circular driving element keyed to said shaft and having inwardly extending hub portion surrounding said shaft, a circular carrier plate revolubly mounted upon said hub, a sprocket mounted upon said shaft inwardly of said plate, a radially extending lug affixed to said driving element, an outwardly extending lug affixed to said plate adjacent the periphery thereof, said lugs adapted to engage and drive with a lost motion of slightly less than one complete revolution of said driving element, and a shear pin interconnecting said sprocket and said plate, said plate and said sprocket each having a plurality of circumferentially spaced openings therethrough, and said pin being positioned in a pair of registering openings.

3. A device of the character described comprising a shaft, a circular driving element keyed to said shaft and having inwardly extending hub portion surrounding said shaft, a circular carrier plate revolubly mounted upon said hub, a sprocket mounted upon said shaft inwardly of said plate, a radially extending lug affixed to said driving element, an outwardly extending lug affixed to said plate adjacent the periphery thereof, said lugs adapted to engage and drive with a lost motion of slightly less than one complete revolution of said driving element, and a shear pin interconnecting said sprocket and said plate, said plate and said sprocket each having a different number of circumferentially spaced openings therethrough, and said pin being positioned in a pair of registering openings in said plate and said sprocket.

GORDON A. REAM.

References Cited in the file of this patent

UNITED STATES PATENTS

| Number | Name | Date |
|---|---|---|
| 1,493,188 | Campbell | May 6, 1924 |
| 1,972,601 | Regan | Sept. 4, 1934 |
| 2,099,359 | Woodeson et al. | Nov. 16, 1937 |
| 2,144,269 | Peltz | Jan. 17, 1939 |

FOREIGN PATENTS

| Number | Country | Date |
|---|---|---|
| 333,287 | Great Britain | 1930 |